United States Patent [19]

Frederick et al.

[11] Patent Number: 4,972,268
[45] Date of Patent: Nov. 20, 1990

[54] DUAL FOCUS RANGE APPARATUS FOR TV CAMERA

[75] Inventors: David T. Frederick, Salunga; Mark A. Ellis, Lancaster, both of Pa.

[73] Assignee: Burle Technologies, Inc., Wilmington, Del.

[21] Appl. No.: 369,265

[22] Filed: Jun. 21, 1989

[51] Int. Cl.$^5$ .............................................. H04N 5/30
[52] U.S. Cl. ................................... 358/227; 358/229
[58] Field of Search ............... 358/227, 225, 229, 209, 358/909; 354/400, 405

[56] References Cited

U.S. PATENT DOCUMENTS

| | | | |
|---|---|---|---|
| 3,573,367 | 4/1971 | LaRue | 358/227 |
| 4,369,470 | 1/1983 | Contant | 358/227 |
| 4,392,726 | 7/1983 | Kimura | 358/227 |
| 4,485,406 | 11/1984 | Brownstein | 358/227 |
| 4,614,974 | 9/1986 | Toyama | 358/227 |
| 4,725,863 | 2/1988 | Dumbreck | 358/227 |
| 4,742,401 | 5/1988 | Andree | 358/227 |

Primary Examiner—Stephen Brinich
Attorney, Agent, or Firm—Martin Fruitman

[57] ABSTRACT

A focusing system for closed circuit video cameras. A carrier block to which the image sensing device is attached is moved parallel to the lens axis for focusing images at close range because of the use of lenses normally focused at infinity or changes of focus required by system tolerances. The carrier block motion is accomplished by the use of two cams on a single shaft. The cams press against the carrier block and move the carrier block on guide rods as the cam shaft is turned. In order to attain two focusing ranges, the cam shaft itself is located within two pivoting saddles rather than being fixed. The saddles pivot on a fixed shaft which permits the entire focusing mechanism to be moved in one step between two preset positions. Each of the two positions is selected to be appropriate for one of two lenses.

4 Claims, 2 Drawing Sheets

DUAL FOCUS RANGE APPARATUS FOR TV CAMERA

SUMMARY OF THE INVENTION

This invention deals generally with TV cameras and more specifically with a focusing apparatus for such cameras.

Although the most familiar method of focusing cameras is by adjusting the location of the camera lens, there is another accepted focusing method called "back focusing". With this procedure the camera lens remains in a fixed location and the image plane, the surface upon which the image is displayed, is moved. While this method is rarely used in film cameras because of the mechanical complexity involved, it is not unusual to use it in TV cameras where the image surface is a tube or semiconductor surface for which the focusing motion is the only movement.

However, one difficulty with using back focusing is that most back focus mechanisms have very limited ranges, and therefore are limited to use with only one lens. The total adjustment furnished by a typical back focus mechanism is of the order of one tenth of an inch, and such a small adjustment can not accommodate to the movement required if one lens type is exchanged for another. Nevertheless, there are times when just such an exchange is required. If, for instance, one camera body is built to accept two lens systems, it is desirable to merely adjust the focus with an external control when lenses are replaced rather than to dismantle the camera to make internal mechanical changes.

The preferred embodiment of the present invention furnishes just such an external adjustment. For its basic, continuous, focus action it uses a semiconductor image sensor mounted on a flat plate called the carrier block. This carrier block rides on guide rods within holes in the carrier block. A pair of eccentric cams which are mounted on a fixed shaft are located in contact with one surface of the carrier block, so that as the cams are rotated they push the carrier plate assembly in one direction or the other. This motion furnishes the typical continuous focus adjustment for any one lens installed in the camera.

The continuous focus mechanism uses a leaf spring for the cam guide surface opposite the carrier block. The leaf spring, which is designed so that it is always in contact with the cam, holds the cam tightly in place and therefore eliminates undesirable clearance between the cam and the carrier block. The spring force of the leaf spring also increases the friction between the cam and both the leaf spring and the carrier block, so that neither the cam nor the carrier block will move unless moved by the positive rotation of the cam shaft.

The preferred embodiment of the invention also furnishes a second focus adjustment which produces a step change in the location of the image surface, and therefore can be used to extend a camera's focus range to accommodate more than one lens type. This is done by mounting the ends of the camshaft in saddles which pivot between two positions, rather than in fixed bearings. These saddles turn on a shaft which is accessible from outside the camera, and the change of focus range can therefore be accomplished without opening up the camera.

The present invention thereby furnishes a camera with two focus adjustments, one being a conventional arrangement with a continuous small adjustment, and the second being a step function adjustment. It should be understood, however, that each adjustment is independent of the other and both are available at all times, thus providing the continuous adjustment regardless of which setting the step adjustment is in.

DETAILED DESCRIPTION OF THE INVENTION

Figure 1:
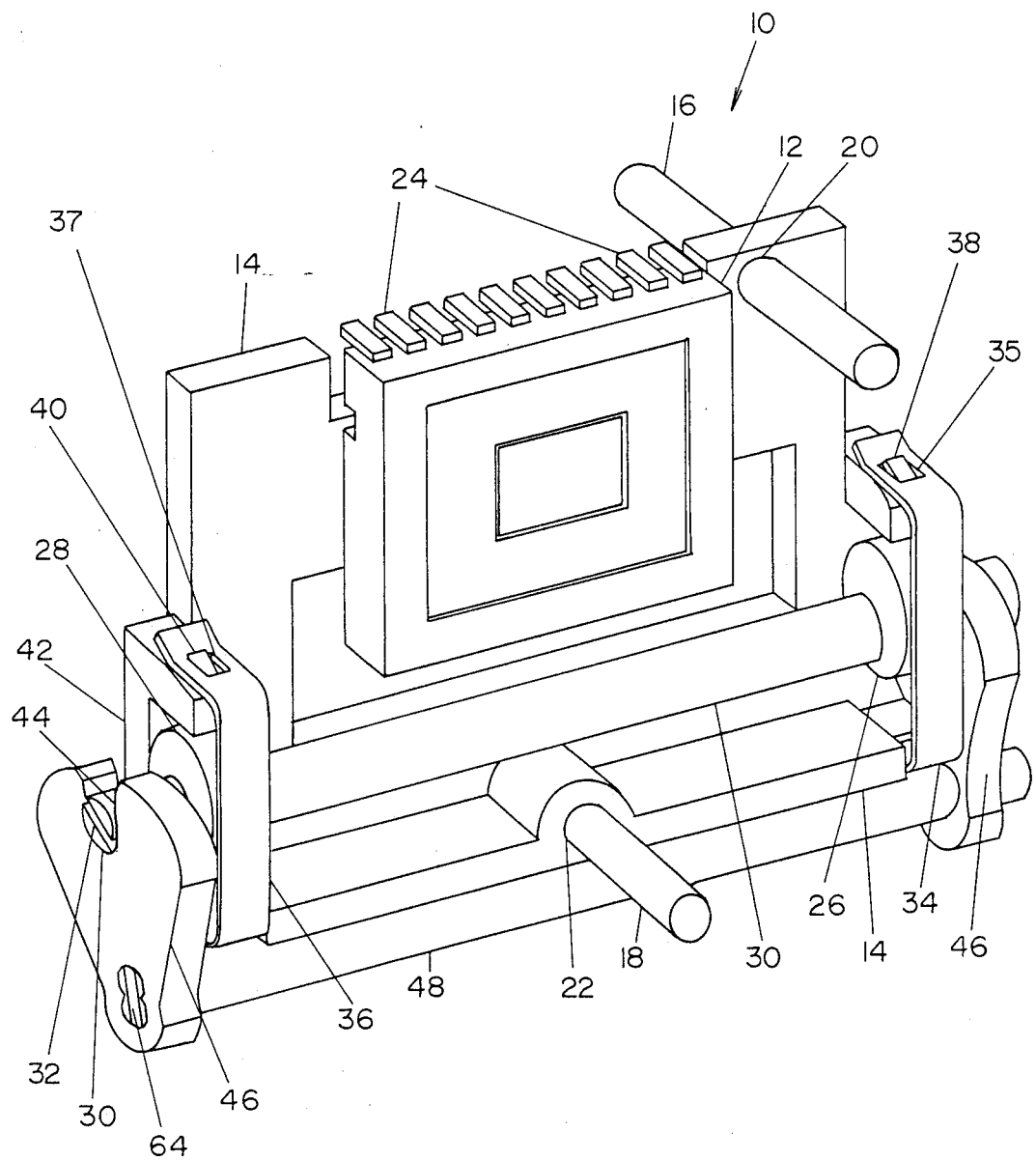
FIG. 1 is a perspective view of the preferred embodiment of the apparatus of the invention.

FIG. 1 is a perspective view of the preferred embodiment of back focus mechanism 10 in which semiconductor image sensor 12 is attached to carrier block 14. Both the conventional continuous focusing action and the step change in the focusing range of the system are provided by the motion of carrier block 14 as it slides on guide rods 16 and 18 which pass through holes 20 and 22, respectively, in carrier block 14. Guide rods 16 and 18 are attached to a fixed surface (not shown) of the camera body which contains the lens mount and are located perpendicular to the plane of carrier block 14, so that they prevent it from rotating, but permit it to move in a direction perpendicular to its own plane.

Image sensor 12 is attached to carrier block 14 by conventional bonding methods, so that image sensor 12 moves along with carrier block 14. The electrical connections 24 of image sensor 12 are interconnected with other circuitry in the TV camera in which back focus mechanism 10 is installed by means of conventional flexible cables (not shown) which are only required to accommodate the small linear focusing motion of carrier block 14, which, even for both focusing ranges, is only approximately one third of an inch.

The continuous focusing movement of carrier block 14 is driven by eccentric cams 26 and 28 which are attached to rotatable shaft 30. Shaft 30 is supported by pivotable saddle 44 and a matching saddle at the other end of shaft 30 which can not be seen. These saddles substitute for fixed bearings which are typically used in a conventional single range focusing system, and although the saddles themselves pivot, when they are in any one position shaft 30 is essentially fixed in its location and carrier block 14 can be moved relative to shaft 30 for continuous focusing. Saddle 44, and its mate on the other end of shaft 30, are located in pivot fixtures 46 which are attached to shaft 48.

Figure 2:
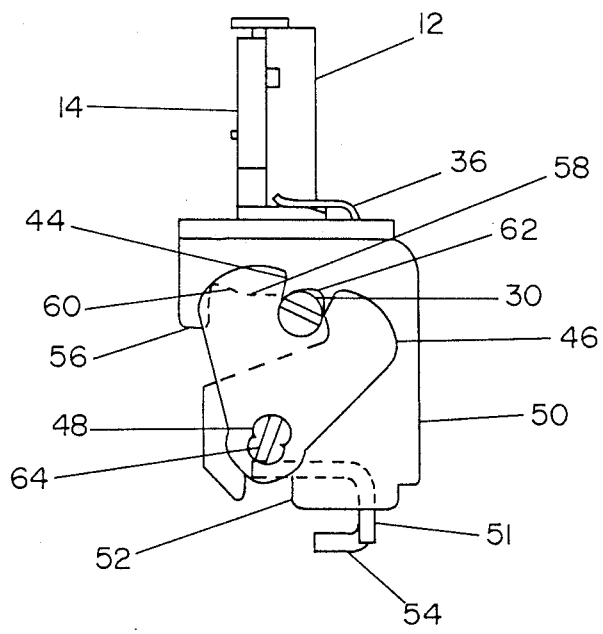
FIG. 2 is a side view of the carrier block assembly of the preferred embodiment.

As seen in FIG. 2, which is a side view of the carrier block assembly, and does not show guide rods 16 and 18, shaft 48 is itself held in a fixed location within bearing plate 50 which is held in a fixed relationship to the camera body by tab 51. Shaft 48 is located within slot 52 in bearing plate 50 and is subjected to an upwardly directed force by spring 54 to hold it in place, but still permit some small vertical motion. This motion is part of a detent action to provide shaft 30 with two distinct positions.

The detent action is provided by the interaction of shaft 30 with slot 56. At its top, slot 56 has curved portion 58, with indentations 60 and 62 at the ends of curved portion 58. As saddle 44 is pivoted with shaft 48 which is spring loaded upward, shaft 30 lodges in indentations 60 and 62 when it reaches them. This provides a repeatable location and assures that the continuous focusing action will have a fixed relationship to the camera body.

Since the adjustment for different lenses is not required frequently, shaft 48 is rotated by means of screwdriver slot 64, but it would also be possible to turn it by other means.

Since, for the preferred embodiment, the back focusing adjustment is also used only occasionally, shaft 30 is also rotated by means of screwdriver slot 32, but other rotating means are also possible.

As cams 26 and 28 are rotated they push against carrier block 14 to move it in one direction, and they push against leaf springs 34 and 36 to move carrier block 14 in the other direction. Leaf spring 34 has holes 35 at both ends which snap onto wedge shaped catches 35 to anchor the spring to carrier block 14. Similarly, leaf spring 36 has holes 37 which attach to catches 40. For both springs the lower holes and catches can not be seen in the FIG. 1, but they are similar to the upper ones. This attachment arrangement requires that a force be applied to the springs at all times by their respective cams, so that the location of the catches and the shape of the springs must be arranged to that the spring still applies a force to the cam when the cam is causing the minimum deflection of the spring.

Assembly of the cam arrangement is also greatly simplified by the apparatus of the preferred embodiment. The spring arrangement for one side of the cam guide permits the cams to first be located within the "C" shaped portion 42 of carrier block 14, and then the leaf spring is held against the cam while its ends are deflected until the holes snap onto the catches. Hole 37 of spring 36 is shown in FIG. 1 just before it lodges on catch 40.

The present invention thereby provides a simple back focus mechanism which has no backlash, assembles easily, resists undesirable motion from shock and vibration and provides two focusing ranges so that a camera can be used with two types of lenses without any mechanical modifications required when lenses are interchanged.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For instance, shaft mounted continuous focusing means other than cams 26 and 28 could be used, and the dual range step focus apparatus of the invention would still operate. Furthermore, the dual range focus mechanism described could also act upon pins protruding from the frame of a continuous focus mechanism rather than upon a shaft.

What is claimed as new and for which Letters Patent of the United States ar desired to be secured is:

1. A multiple range back focus apparatus for a TV camera comprising:

a first focusing means which moves an image surface of the camera relative to a camera lens, the first focusing means including a first structure to which the movement of the image surface is related in the same manner as it is related to the camera lens;

two cylindrical protrusions attached to the first structure of the first focusing means and oriented so that the axis of each cylindrical protrusion is in a plane parallel to the image surface;

two pivot fixtures attached to a shaft and pivoting in a plane parallel to the axis of the lens with rotation of the shaft, the shaft being located in a plane which is fixed in relationship to a lens support structure of the camera, each pivot fixture including a capture means by which one cylindrical protrusion of the first focusing means is rotatably attached to a pivot fixture, the capture means being spaced from the shaft so that they move in a direction parallel to the axis of the lens when the shaft is rotated; and means to rotate the shaft.

2. The multiple range back focus apparatus of claim 1 further including a detent means which acts upon the rotation of the shaft so as to produce at least two distinct positions within its rotation.

3. The multiple range back focus apparatus of claim 1 wherein the cylindrical protrusions are opposite ends of a shaft operating within the first focusing means.

4. The multiple range back focus apparatus of claim 1 wherein the means to rotate the shaft is a screwdriver slot.

* * * * *